G. W. HASKINS AND E. H. KELLOGG.
AIR PRESSURE REGULATOR FOR PNEUMATIC TIRES.
APPLICATION FILED DEC. 1, 1916.

1,303,893.

Patented May 20, 1919.

WITNESSES

INVENTORS
G. W. Haskins,
E. H. Kellogg.

BY Victor J. Evans
ATTORNEY

UNITED STATES PATENT OFFICE.

GEORGE W. HASKINS AND EARLE H. KELLOGG, OF LOVELL, OKLAHOMA.

AIR-PRESSURE REGULATOR FOR PNEUMATIC TIRES.

1,303,893. Specification of Letters Patent. Patented May 20, 1919.

Application filed December 1, 1916. Serial No. 134,491.

*To all whom it may concern:*

Be it known that we, GEORGE W. HASKINS and EARLE H. KELLOGG, citizens of the United States, residing at Lovell, in the county of Logan and State of Oklahoma, have invented new and useful Improvements in Air-Pressure Regulators for Pneumatic Tires, of which the following is a specification.

This invention relates to air pressure regulators for pneumatic tires, the object in view being to provide a simple device of the character referred to which may be connected to the tire valve casing of an ordinary pneumatic tire, and which will thereafter keep the air pressure in the tire at a predetermined point, the device as far as itself is concerned, preventing the escape of the air from the tire and serving in case of a fall in the air pressure within the tire, to force an additional supply of air into the tire to compensate for that which has leaked or escaped therefrom, the device being thus entirely automatic in its operation.

With the above and other objects in view, the invention consists in the novel construction, combination and arrangement of parts, as herein fully described, illustrated and claimed.

In the accompanying drawing:—

Figure 1:
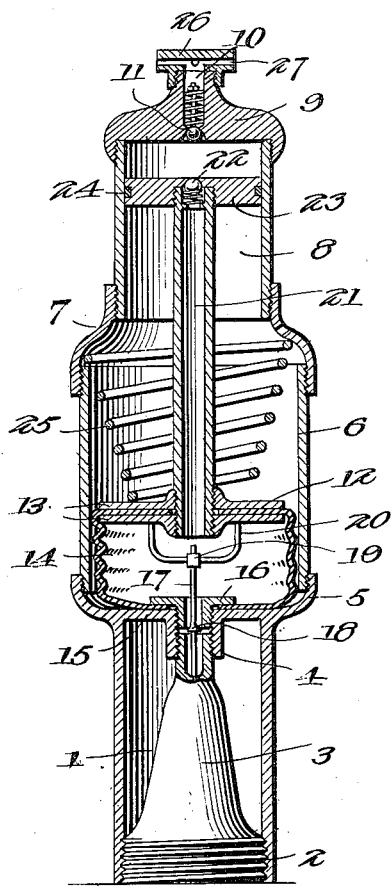
Figure 1 is a longitudinal section through the air pressure regulator for pneumatic tires, showing the position of the parts when the tire valve is unseated.

The device, in the preferred embodiment thereof, comprises an attaching base 1 which is of tubular formation and is threaded at 2 to enable the same to be fastened to a tire valve casing 3 such as is commonly employed in connection with the inner tubes of pneumatic tires. The base 1 is also formed with a central longitudinally extending internally threaded boss 4 which is adapted to be secured upon the reduced and threaded extremity of the tire valve casing 3 in the manner illustrated in the drawings.

The outer portion of the base is enlarged and cupped as indicated at 5 and is internally threaded to receive and hold the adjacent extremity of a barrel shaped body or shell 6, the latter being threaded to connect with the enlarged portion 5 of the base 1. The shell 6 may be of any suitable length and the outer end thereof is externally threaded and screwed into the internally threaded larger portion of a reducing coupling or fitting 7. The reduced portion of said coupling 7 is internally threaded to receive the externally threaded extremity of a pump barrel 8 and the latter is in turn externally threaded at its outer end to fit the internally threaded cap 9 which is screwed thereon and which is formed with a central longitudinal air passage 10 in which is arranged a spring seated primary inlet check valve 11 the purpose of which will presently appear.

Mounted to reciprocate in the shell 6 is a plunger head 12 shown as comprising a pair of disk shaped plates 13 between which is clamped the outer end portion of a flexible air bag 14 which may consist of rubber or any other suitable material impervious to air. The inner end of the bag is clamped against the outer end wall 15 of the base 1 by means of a flanged and threaded plug 16 which is screwed into the internally threaded tubular boss 4 hereinabove referred to.

Connected to the plunger head 12 is a valve unseating member 17 shown in the form of a rod or stem the inner extremity of which is enlarged or formed with a head 18 which is adapted to bear against the stem of the tire valve for the purpose of unseating the latter. The rod or stem 17 has a threaded and adjustable connection at 19 with a spider or bar 20 terminally attached in fixed relation to the inner side of the plunger head 12. The stem 17 is adjustable in the manner shown and described in order to adapt it to the position of the stem of the valve in the tire valve casing 3, it being understood that said valve stems project more or less.

Figure 2:
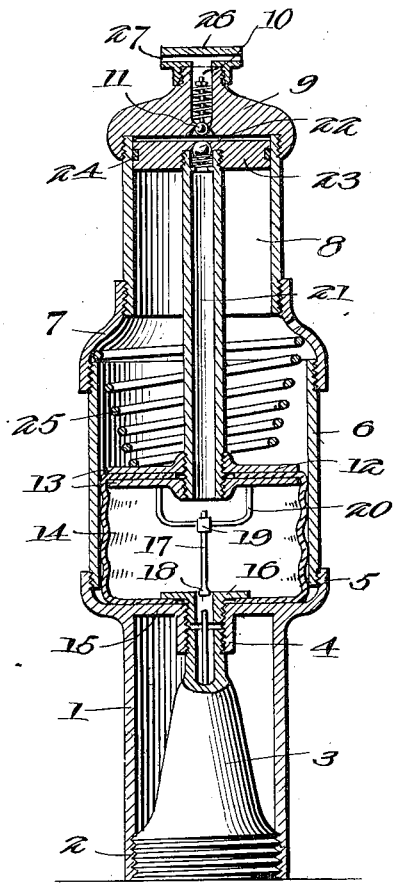
Fig. 2 is a similar view showing the position of the parts when the tire is fully inflated.

The plunger head 12 is fixedly mounted upon the inner extremity of a tubular plunger 21, said plunger being open at both ends and being equipped with an inwardly opening secondary air inlet check valve 22. Fixedly mounted upon the outer extremity of the tubular plunger 21 is a pump piston 23 shown as provided with a packing ring 24. A piston return spring 25 is interposed between the plunger head 12 and the shoulder formed by the reducing coupling or fitting 7, said spring being of the expansion type and acting against the plunger head 12 to move the latter together with the stem 21 and piston 23 inwardly from the position shown in Fig. 2 to the position shown in Fig. 1.

In order to utilize the device hereinabove described, the usual valve cap or thimble is removed, and the device is applied to the valve casing 3 in lieu thereof. The tire is then inflated in the usual way and when properly inflated, and during the inflating process, a portion of the air passes into the flexible air bag 14 and presses outwardly against the plunger head 12. When the tire has been fully inflated, the plunger head 12 has moved outwardly to approximately the position illustrated in Fig. 2 where it remains until the air pressure in the tire decreases. When said air pressure falls below a predetermined point, the stem 17 unseats the tire valve by reason of the head 18 coming in contact therewith, caused by a reduction of air pressure within the air pressure chamber formed by the flexible air bag 14 in conjunction with the plunger head 12. As the wheel equipped with the pneumatic tire revolves and passes over obstructions, there is a variation in the pressure in the tire due to the distortion of the tire walls and especially the tread and therefore pressure in the bag 14 fluctuates, resulting in a back and forth movement of the plunger head 12 and a corresponding back and forth movement of the pump piston 23. As the piston 23 moves inwardly, air is drawn past the primary check valve 11 into the pump barrel 8 and then as the piston 23 moves outwardly, the air compressed in the outer end of the pump barrel 8 is forced past the check valve 22 and through the tubular plunger 21 into the flexible air bag 14 and thence into the tire while the tire valve is held unseated by the rod or valve unseating member 17. This operation continues until the pressure within the tire again reaches a predetermined point whereupon the member 17 moves out of engagement with the tire valve stem or exerts an insufficient pressure thereon to unseat said valve. By turning the pump barrel 8 so as to shift said barrel outwardly or inwardly in relation to the reducing coupling or fitting 7, the air compression space between the piston 23 and cap 9 may be increased or diminished and in this way the device may be set to maintain the pressure in the tire at any desired predetermined point.

In connection with the cap 9 we preferably employ an additional smaller cap 26 for closing the air inlet opening 10 and provide said cap 26 with one or more air inlet passages 27, permitting air to enter the valve indirectly while providing for the exclusion of foreign matter. The regulator as a whole may be removed from the tire valve casing when inflating the tire with an ordinary pump or air compressor or with air from a high pressure tank, after which the regulator is again attached to the valve casing, requiring only the same operation as is required to remove and replace the ordinary valve protecting cap.

We claim:—

1. A device for regulating the air pressure of pneumatic tires, comprising a shell, means for fastening said shell to a tire valve casing, an air pressure operated plunger head movable back and forth in said shell and forming in conjunction therewith an air pressure chamber, a valve unseating member carried by said plunger head, a pump barrel forming an extension of said shell, a closure for the outer end of said pump barrel formed with an air passage extending therethrough, an inwardly opening check valve controlling said air passage, an air compressing piston working in said barrel, a tubular plunger open at both ends and having said plunger head and piston mounted thereon at opposite ends thereof, a secondary check valve controlling the passage through said tubular plunger, and yieldable means for returning said plunger head to the initial end of its working stroke.

2. A device for regulating the air pressure of pneumatic tires, comprising a shell, means for fastening said shell to a tire valve casing, an air pressure operated plunger head movable back and forth in said shell and forming in conjunction therewith an air pressure chamber, a valve unseating member carried by said piston, a pump barrel forming an extension of said shell, a closure for the outer end of said pump barrel formed with an air passage extending therethrough, an inwardly opening check valve controlling said air passage, an air compressing piston working in said barrel, a tubular plunger open at both ends and having said plunger head and piston mounted thereon at opposite ends thereof, a secondary check valve controlling the passage through said tubular plunger, a return spring for said plunger head, and a flexible air bag contained within said shell and having a part thereof fastened to and carried by the air pressure plunger head and having another part thereof fastened to the inner wall of the air pressure chamber, said bag being in communication with the tubular plunger and also with the tire valve casing.

In testimony whereof we affix our signatures.

GEORGE W. HASKINS.
EARLE H. KELLOGG.